(12) United States Patent
Deneka et al.

(10) Patent No.: US 6,539,140 B1
(45) Date of Patent: Mar. 25, 2003

(54) MAGNETIC LATCHING SYSTEM FOR MEMS OPTIC SWITCHES

(75) Inventors: Charles W. Deneka, Corning, NY (US); Bernard Eid, Corning, NY (US); Xiaodong R. Fu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 35 days.

(21) Appl. No.: 09/649,242

(22) Filed: Aug. 28, 2000

(51) Int. Cl.[7] .............................. G02B 6/42; G02B 6/00
(52) U.S. Cl. .................................... 385/18; 385/147
(58) Field of Search ........................... 385/14, 15, 16, 385/18, 19, 147, 10

(56) References Cited

U.S. PATENT DOCUMENTS

| | | | | |
|---|---|---|---|---|
| 5,761,352 A | * | 6/1998 | Kitajima et al. | 385/16 |
| 6,136,212 A | * | 10/2000 | Mastrangelo et al. | 216/27 |
| 6,173,105 B1 | * | 1/2001 | Aksyuk et al. | 383/14 |
| 6,198,606 B1 | * | 3/2001 | Boutaghou et al. | 360/294.3 |
| 6,212,314 B1 | * | 4/2001 | Ford | 385/10 |
| 6,243,507 B1 | * | 6/2001 | Goldstein et al. | 385/13 |
| 6,246,826 B1 | * | 6/2001 | O'Keefe et al. | 385/140 |
| 6,303,885 B1 | * | 10/2001 | Hichwa et al. | 200/181 |

* cited by examiner

Primary Examiner—Akm E. Ullah
(74) Attorney, Agent, or Firm—Joanne N. Pappas

(57) ABSTRACT

A micro-electro-mechanical system (MEMS) optical switch has a passive latching system. The switch includes a reflective element and a switch actuator for moving the reflective element to a first position based on a switching signal. The passive latching system is coupled to the switch actuator, where the passive latching system maintains the reflective element in the first position when the switching signal is discontinued. The latching system has a first magnet configuration coupled to a first portion of the switch actuator, and a second magnet configuration coupled to a second portion of the actuator. Thus, a magnetic force biases the magnetic configurations together when the reflective element is in the first position and the switching signal is discontinued. The latching is discontinued by using the switching signal to raise the temperature of one of the magnet configurations above its Curie point. The use of a passive latching system improves reliability, reduces cost, and enables the optical switch to serve as a viable alternative to conventional switching devices.

19 Claims, 2 Drawing Sheets

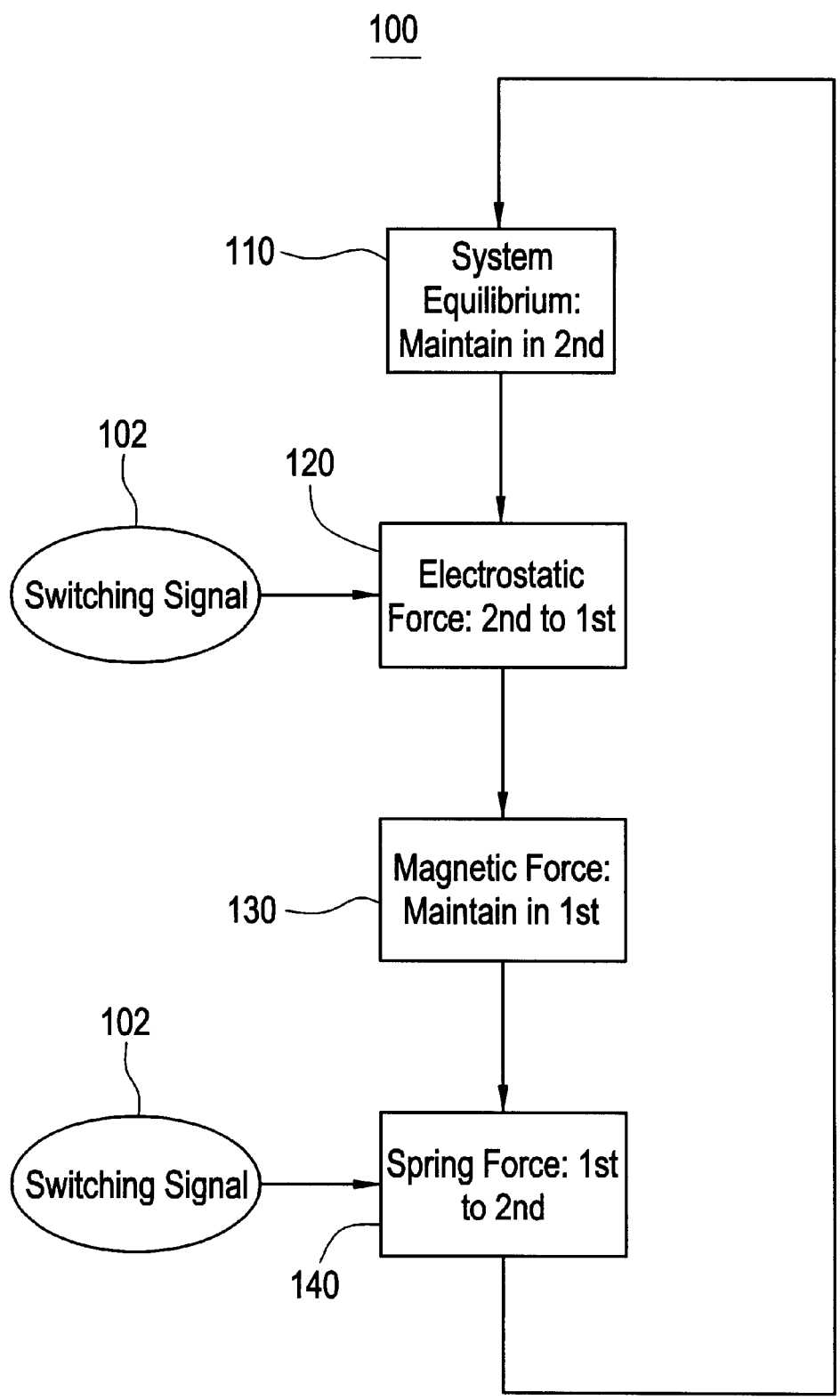

MAGNETIC LATCHING SYSTEM FOR MEMS OPTIC SWITCHES

BACKGROUND OF THE INVENTION

1. Field of the Invention

The present invention generally relates to optical switching. More particularly, the present invention relates to a micro-electro-mechanical-system optical switch having a passive latching system.

2. Technical Background

The primary goals of communications technologies have always included the improvement of transmission fidelity, the increase of data rates, and the increase of distance between relay stations. The speed at which light travels and its potential to address all of these concerns logically led to attempts at optical communication. Early experiments with optical communications suggested the feasibility of modulating a coherent optical carrier wave at very high frequencies, but were commercially impractical because of the installation expense and the tremendous cost of developing the necessary components. The combination of semiconductor technology, which provided the necessary light sources and photodetectors, and optical wave guide technology, however, eventually enabled the development and application of optical fiber-spaced systems despite these initially perceived difficulties.

Optical networking involves the management and coordination of various functions such as optical transport and optical switching. Earlier approaches to optical switching actually involved the conversion of optical signals into electrical signals and switching of the electrical signals. This type of electrical/optical conversion proved to be both difficult to implement and costly due to the required transformation into and out of the electrical domain. As a result, more recent approaches have attempted to perform switching in the optical domain.

Optical switching in the networking context presents its own set of unique concerns. For example, in order to efficiently manage the increasing number of optical signals and wavelength channels, optical switches must be significantly reduced in size. Micro-electro-mechanical-systems (MEMS) have recently been developed based on semiconductor processes, and applied in the areas of medicine, life science, sensors, aerospace, micro-satellites and data storage. MEMS technology allows conventionally large components to be reduced to sizes not previously available. While some attempts have been made at applying MEMS technology to optical switching in the networking context, certain concerns such as reliability and power supply still remain.

In fact, reliability of optical cross connect switches is at the forefront of the development of optical networking. Specifically, conventional optical switches have not adequately addressed the issue of latching, and the result has been a considerable decrease in reliability. For example, to ensure the reliability of a MEMS switch, it is best that the reflective element be latched so that it stays in the "on" or the "off" position when power is not being applied. This is known as "passive latching". Without latching, external forces such as earthquake tremors and foreign object interference could cause the reflective element to be jarred out of its desired position. Furthermore, active latching systems require dedicated power and control. Accidental power outages can therefore cause these systems to malfunction, thereby raising additional reliability concerns. Thus, active latching systems add to the overall cost and complexity of the switching system. It is therefore desirable to provide an optical switch using MEMS technology that has a passive latching system.

SUMMARY OF THE INVENTION

In accordance with the present invention, a micro-electro-mechanical system (MEMS) optical switch is provided. The switch has a reflective element and a switch actuator for moving the reflective element to a first position based on a switching signal. The optical switch further includes a passive latching system coupled to the switch actuator, where the passive latching system maintains the reflective element in the first position when the switching signal is discontinued. The use of a passive latching system improves reliability, reduces costs, and enables the optical switch to serve as a viable alternative to conventional switching devices.

Further, in accordance with the present invention, an optical switch passive latching system for maintaining a reflective element in a first position when a switching signal is discontinued is provided. The latching system has a first magnet configuration coupled to a first portion of a switch actuator. A second magnet configuration is coupled to a second portion of the actuator such that a magnetic force biases the magnetic configurations together when the reflective element is in the first position and the switching signal is discontinued. The use of magnets provides an inexpensive, passive approach to improving reliability by latching.

In another aspect of the invention, a method is provided for switching a reflective element between a first position and a second position based on a switching signal. The method includes the step of moving the reflective element from the second position to the first position based on an electrostatic force between a first electrode and a second electrode. The reflective element is maintained in the first position when the switching signal is discontinued based on a magnetic force between a first magnet configuration and a second magnet configuration. The magnet configurations are coupled to the electrodes. The method further provides for moving the reflective element from the first position to the second position based on a spring force between the electrodes and based on the switching signal. The switching signal reduces the magnetic force between the magnetic configurations to a predetermined forced threshold. In a preferred embodiment, the reflective element is maintained in the second position when the switching signal is discontinued based on a system equilibrium.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings, in which:

FIG. 3 is a flowchart of a method for switching a reflective element between a first position and a second position based on a switching signal in accordance with the principals of the present invention.

DETAILED DESCRIPTION OF THE PREFERRED EMBODIMENTS

Figure 1:
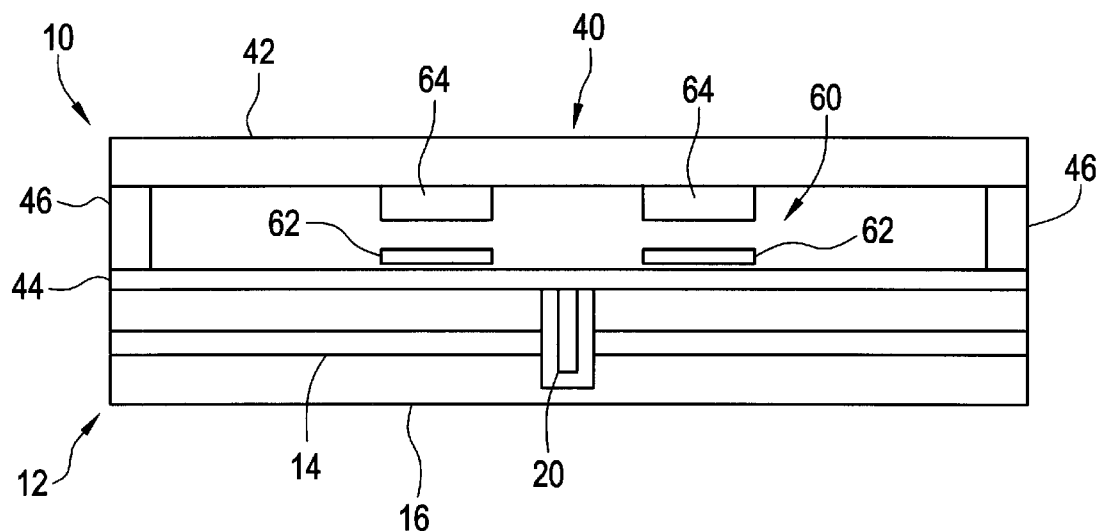
FIG. 1 is a side view of an optical switch at system equilibrium in accordance with the principals of the present invention.

Reference will now be made in detail to the present preferred embodiments of the invention, examples of which are illustrated in the accompanying drawings. Wherever possible, the same reference numerals will be used throughout the drawings to refer to the same or like parts.

Turning now to FIG. 1, the preferred micro-electromechanical-system (MEMS) optical switch is shown generally at 10. The switch 10 is used in conjunction with a light guide 12 having a core 14 surrounded by a cladding 16. The core 14 transports an optical signal upon which the switch 10 operates. While the preferred light guide 12 is part of lightwave optical circuit (LOC), any optical medium can be readily used. Nevertheless, it can be seen that the switch 10 has a reflective element 20, a switch actuator 40 and a passive latching system 60. The switch actuator 40 moves the reflective element 20 from a second position to a first position (to be described below) based on a switching signal. Thus, FIG. 1 demonstrates the reflective element 20 in the second position before the switching signal is applied. When the switching signal is applied, the reflective element 20 transitions to the first position as shown in FIG. 2.

Figure 2:
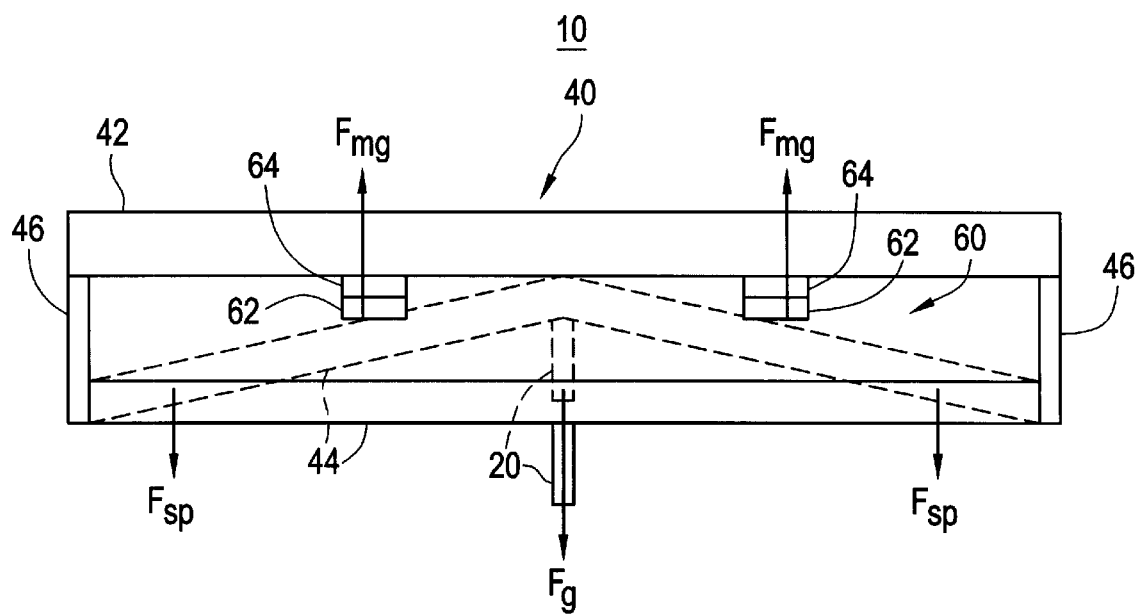
FIG. 2 is a side view of an optical switch in a first position in accordance with the principals of the present invention.

With continuing reference to FIGS. 1 and 2, it can be seen that the passive latching system 60 is coupled to the switch actuator 40, where the latching system 60 maintains the reflective element 20 in the first position when the switching signal is discontinued. Generally, the latching system 60 includes a plurality of magnets. It is preferred that the plurality of magnets includes a first magnet configuration 62 and a second magnet configuration 64. The first magnet configuration 62 is coupled to a first portion of the actuator 40, and the second magnet configuration 64 is coupled to a second portion of the actuator 40. The result is that a magnetic force $F_{mg}$ biases the magnet configurations 62, 64 together when the reflective element 20 is in the first position and the switching signal is discontinued.

In order to permit "unlocking" of the latching mechanism, the magnet configurations 62, 64 are designed such that $F_{mg}$ is reduced to a predetermined force threshold when the switching signal is applied to the actuator 40 and the reflective element 20 is in the first position. This can be done by selecting a ferromagnetic material for the first magnet configuration 62, where the ferromagnetic material has an associated temperature threshold. Thus, the second magnet configuration 64 can be selected from a permanent magnet material, and the attraction between the magnet configurations 62, 64 will be weakened to the point that the reflective element 20 will return to the second position shown in FIG. 1. The switching signal raises the temperature of the ferromagnetic material above the temperature threshold such that $F_{mg}$ is reduced to the predetermined force threshold. A heat conductive coating can be applied to the first magnetic configuration 62 to speed up the heating process. It is well known that the Curie point of a ferromagnetic material is the temperature at which the material will become perromagnetic.

It is important to note that the Curie point of the ferromagnetic material should be significantly lower than that of the permanent magnet material used for the second magnet configuration 64. This will ensure that the second magnet configuration 64 maintains its permanent magnetic properties when the ferromagnetic material is heated above its Curie point. The magnetic energy and force can be estimated by the following formulas:

$$W = \frac{1}{2}\frac{B^2(r)}{\mu}V(r) \quad F_{mg} = \frac{\partial W}{\partial r}$$

Where:
W—the magnetic energy
B—the magnetic field
$\mu$—the permeability of the ferromagnetic material
A—the surface area of the magnet
r—the air gap between magnets
$F_{mg}$—the magnetic force
V(r)—the magnetic field volume, such that V(r)=A·r For a small air gap geometry, assuming the magnetic field B to be constant, the magnetic force can be expressed:

$$F_{mg} = \frac{B^2 A}{2\mu}$$

To better understand the operation of the switch 10, the actuator 40 will now be described in greater detail. Specifically, the actuator 40 preferably includes a first electrode 42, and a second electrode 44 coupled to the reflective element 20. It can be seen that the second electrode 44 is movable in relation to the first electrode 42. Thus, the switching signal generates an electrostatic force between the first electrode 42 and the second electrode 44 such that the electrostatic force moves the second electrode 44 from the second position to the first position. It can further be seen that the actuator 40 also has a leveraging device 46 disposed between the first electrode 42 and the second electrode 44. This establishes a predetermined spring force $F_{sp}$ between the electrodes 42, 40 when the reflective element 20 is in the first position. The spring force $F_{sp}$ tends to bias the reflective element 20 toward the second position.

It will therefore be appreciated that the above forces need to be balanced in a manner that provides for passive latching. The magnetic force $F_{mg}$ will be greater than the combination of $F_{sp}$ and the gravitational force $F_g$ of the second electrode 44 when the ferromagnetic material is not heated. $F_{mg}$ will be smaller than $F_{sp}+F_g$ when the ferromagnetic material is heated and becomes paramagnetic. The following table shows several ferromagnetic materials that are acceptable for the present invention.

| Material | $\mu_r$ | Curie Point (C) |
|---|---|---|
| Fe | 150 | 770 |
| Fe + 4% Si | 2000 | 690 |
| Mumetal (77Ni-16Fe-5Cu-2Cr) | 50000 | 350 |
| Ticonal GX(Co-Ni-Al-Cu) | Br = 1.35T; Hc = 58kAm$^{-1}$ | 860 |
| MnZn Ferrites | 500–10000 | 90–500 |

Turning now to FIG. 3, a method 100 for switching a reflective element between a first position and a second position based on a switching signal is shown. It can be seen that at step 110 the reflective element is maintained in the second position when the switching signal is discontinued based on a system equilibrium, where the system equilibrium defines a state in which the electrodes reach a minimum potential energy. At step 120 the reflective element is moved from the second position to the first position based on an electrostatic force between the first electrode and the second electrode. This electrostatic force is generated by the switching signal 102.

It can further be seen that the reflective element is maintained (i.e. latched) in the first position at step 130 when the switching signal 102 is discontinued. This latching is based on the magnetic force between the first magnet configuration and the second magnet configuration, where the magnet configurations are coupled to the electrodes. It is also important to note that the first magnet configuration is ferromagnetic at this point. It can further be seen that at step 140 the reflective element is moved from the first position to the second position based on a spring force between the electrodes and based on the switching signal 102. As already discussed the switching signal 102 reduces the magnetic force $F_{mg}$ between the magnet configurations to a predetermined force threshold such that $F_{sp}+F_g$ is greater than $F_{mg}$.

Thus, the present invention provides enhanced reliability due to passive latching and a unique approach to balancing forces. The resulting optical switch has a longer life span and is easily assembled because no bonding is required.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A micro-electro-mechanical-system (MEMS) optical switch comprising:
    (i) a reflective element;
    (ii) a switch actuator for moving the reflective element to a first position based on a switching signal; and
    (iii) a passive latching system coupled to the switch actuator, the passive latching system maintaining the reflective element in the first position when the switching signal is discontinued and wherein the latching system includes a plurality of magnets.

2. The optical switch of claim 1 wherein the plurality of magnets includes:
    (i) a first magnet configuration coupled to a first portion of the actuator; and
    (ii) a second magnet configuration coupled to a second portion of the actuator such that a magnetic force biases the magnet configurations together when the reflective element is in the first position and the switching signal is discontinued.

3. The optical switch of claim 2 wherein the magnetic force is reduced to a predetermined force threshold when the switching signal is applied to the actuator and the reflective element is in the first position.

4. The optical switch of claim 3 wherein the first magnet configuration includes a ferromagnetic material having a temperature threshold, the switching signal raising a temperature of the ferromagnetic material above the temperature threshold such that the magnetic force is reduced to the predetermined force threshold.

5. The optical switch of claim 4 wherein the temperature threshold is a Curie point corresponding to the ferromagnetic material, the Curie point corresponding to the ferromagnetic material being lower than a Curie point corresponding to the second magnet configuration.

6. The optical switch of claim 4 wherein the ferromagnetic material includes a heat conductive coating.

7. The optical switch of claim 3 wherein the second magnet configuration includes a permanent magnet material.

8. The optical switch of claim 1 wherein the switch actuator includes:
    (i) a first electrode; and
    (ii) a second electrode coupled to the reflective element, the second electrode being movable in relation to the first electrode.

9. The optical switch of claim 8 wherein the switching signal generates an electrostatic force between the first electrode and the second electrode such that the electrostatic force moves the second electrode from a second position to the first position.

10. The optical switch of claim 8 wherein the switch actuator includes a leveraging device disposed between the first electrode and the second electrode such that a predetermined spring force is established between the electrodes when the reflective element is in the first position, the spring force tending to bias the reflective element toward a second position.

11. An optical switch passive latching system for maintaining a reflective element in a first position when a switching signal is discontinued, the latching system comprising:
    (i) a first magnet configuration coupled to a first portion of a switch actuator; and
    (ii) a second magnet configuration coupled to a second portion of the actuator such that a magnetic force biases the magnet configurations together when the reflective element is in the first position and the switching signal is discontinued.

12. The latching system of claim 11 wherein the magnetic force is reduced to a predetermined force threshold when the switching signal is applied to the actuator and the reflective element is in the first position.

13. The latching system of claim 12 wherein the first magnet configuration includes a ferromagnetic material having an associated temperature threshold, the switching signal raising a temperature of the ferromagnetic material above the temperature threshold such that the magnetic force is reduced to the predetermined force threshold.

14. The latching system of claim 13 wherein the temperature threshold is a Curie point corresponding to the ferromagnetic material, the Curie point corresponding to the ferromagnetic material being lower than a Curie point corresponding to the second magnet configuration.

15. The latching system of claim 13 wherein the ferromagnetic material includes a heat conductive coating.

16. The latching system of claim 12 wherein the second magnet configuration includes a permanent magnet material.

17. A method for switching a reflective element between a first position and a second position based on a switching signal, the method comprising the steps of:
    (i) moving the reflective element from the second position to the first position based on an electrostatic force between a first electrode and a second electrode;
    (ii) maintaining the reflective element in the first position when the switching signal is discontinued based on a magnetic force between a first magnet configuration and a second magnet configuration, the magnet configurations coupled to the electrodes; and (iii) moving the reflective element from the first position to the second position based on a spring force between the electrodes and based on the switching signal, the switching signal reducing the magnetic force between the magnet configurations to a predetermined force threshold.

18. The method of claim 17 further including the step of maintaining the reflective element in the second position when the switching signal is discontinued based on a system equilibrium, the system equilibrium defining a state in which the electrodes reach a minimum potential energy.

19. The method of claim 17 further including the step of selecting the magnet configurations such that the predetermined force threshold equals a sum of the spring force and a gravitational force.

* * * * *